United States Patent [19]
Brown et al.

[11] 4,015,969
[45] Apr. 5, 1977

[54] APPARATUS FOR BENDING GLASS SHEETS TO RELATIVELY SHARP ANGLES

[75] Inventors: Laurence A. Brown, Toledo; Floyd T. Hagedorn, Oregon; Foster V. Waltz, Jr., Toledo, all of Ohio

[73] Assignee: Libbey-Owens-Ford Company, Toledo, Ohio

[22] Filed: Jan. 2, 1976

[21] Appl. No.: 646,234

[52] U.S. Cl. .................................. 65/289; 65/107; 65/290

[51] Int. Cl.² ......................................... C03B 23/02

[58] Field of Search ............ 65/103, 107, 288, 290, 65/289

[56] References Cited
UNITED STATES PATENTS

| | | | |
|---|---|---|---|
| 3,248,195 | 4/1966 | Golightly et al. | 65/288 X |
| 3,865,680 | 2/1975 | Reese et al. | 65/107 X |

*Primary Examiner*—Arthur D. Kellogg
*Attorney, Agent, or Firm*—Collins, Oberlin & Darr

[57] ABSTRACT

In apparatus for bending a flat sheet of glass to a relatively sharp angle wherein the apparatus includes a sectionalized, gravity mold structure provided with means for supplying electrical power to electrical conductor lines formed on the glass sheet supported on the mold apparatus and which lead to an electrically conductive path also formed on the sheet along the line about which it is desired to bend the sheet. Opposed electrical contactors, forming a part of the electrical supply means, are urged into engagement with portions of the conductor lines leading to the path to provide continuous contact therewith and uninterrupted current flow during the bending operation. After bending, these contactors are displaced from such conductor lines into an out-of-the-way position for easy removal of the bent sheet and the replacement thereof with a fresh sheet.

13 Claims, 9 Drawing Figures

APPARATUS FOR BENDING GLASS SHEETS TO RELATIVELY SHARP ANGLES

BACKGROUND OF THE INVENTION

The present invention relates generally to the production of bent sheets or plates of glass and, more particularly, to an improved electrical contact assembly employed in apparatus for bending glass sheets to relatively sharp angles.

In accordance with the well-known gravity method for bending glass sheets, such as are intended for use as glazing closures in vehicles and the like, a flat sheet of glass is supported upon a so-called skeleton or outline-tyep bending mold having a substantially continuous shaping surface curved in outline and elevation to the curvature to be imparted to the glass sheet. The mold and sheet are passed through a bending furnace in which the sheet is heated to the softening point of the glass so that it sags by gravity into contact with the shaping surface of the mold and assumes the curvature thereof. The mold can be sectionalized to permit relative movement of the sections during the sagging of the heated glass to impart rather complex curvatures to the glazing closures incorporated in modern-day vehicle designs, for example. After bending, the glass sheet can be annealed or it can be tempered by subjecting the opposite surfaces of the heated sheet to jets or blasts of a cooling medium such as air.

In addition to the complex curvatures mentioned above, it is sometimes desirable to provide a relatively sharp angled or V-shaped bend in the glazing closure transversely or longitudinally thereof along one or more lines to effect wrap-around of the windshield or backlight into the roof line of the vehicle or into the side surfaces thereof. The formation of such bends, i.e., sharp V-shaped bends or bends having very small radii of cruvatures, by the above-described "gravity" bending technique poses problems in fabrication.

Such problems were solved by the glass bending methods disclosed and claimed in U.S. Pat. Nos. 3,762,903 and 3,762,904, assigned to the same assignee as the present invention, whereby an electrically conducting path is formed on at least one surface of the glass sheet along the line about which it is desired to sharply bend the sheet. The sheet is then supported on a suitable gravity mold structure and heated in the furnace to a temperature corresponding to the softening point of the glass, causing it to sag by gravity into conformance with the shaping surfaces of the mold while simultaneously passing an electric current through the electrically conducting path to heat the area of the glass sheet immediately adjacent said path to a temperature above the aforementioned softening point, causing the sheet to bend along such path to form the desired relatively sharp angle therein. In order to provide for a completely automated, mass production operation, a mold apparatus, as described and claimed in U.S. patent application Ser. No. 558,288, filed Mar. 14, 1975, now Pat. No. 4,002,450 and assigned to the same assignee as the present invention, was developed to include electrical conducting means in the mold for supplying electrical current from a suitable source to the electrically conducting path in the glass sheet automatically during the advancement of the sheet through the heating furnace.

Such electrical conducting means on the mold include contactors adapted to engage electrically conducting lines formed on the edges of the sheet and leading to the electrically conducting path about which the glass is to be bent. The present invention constitutes an improvement over the invention escribed and claimed in the aforesaid patent application Ser. No. 558,288 by making certain improvements in the electrical contactors to assure continuous contact with the electrical conducting lines formed on the glass sheet and uninterrupted current flow thereto during the bending of the sheet and displacement of the contactors from the sheet into an out-of-the-way position after bending to facitlitate the removal of a finished bent sheet from the mold and the replacement thereof with a fresh sheet.

SUMMARY OF THE INVENTION

Accordingly, it is primary object of the present invention to provide a new and improved apparatus for more efficiently controlling the bending of glass sheets to relatively sharp angles in a mass production operation.

It is another object of this invention to provide in the foregoing apparatus electrical contactors assuring positive continuous engagement with electrical conducting portions formed on the glass sheet.

It is a further object of this invention to provide an electrical contactor readily movable into an out-of-the-way position to facilitate the loading and unloading of glass sheets onto and from the foregoing mold apparatus.

In one aspect thereof, the articulated mold apparatus of the present invention is characterized by the provision of electrical contactors thereon continuously urged against electrical conducting portions of a glass sheet during relative movement between the mold and such portions in the course of bending the sheet to relatively sharp angles. The contactors are readily disengaged from such portions into an out-of-the-way position during the loading and removal of sheets upon and from the mold apparatus.

The foregoing and other objects, advantages, and characterizing features of the present invention will become clearly apparent from the ensuing detailed description of illustrated embodiments thereof, taken together with the accompanying drawings wherein like reference characters denote like parts throughout the various views.

DESCRIPTION OF THE PREFERRED EMBODIMENTS

Figure 1:
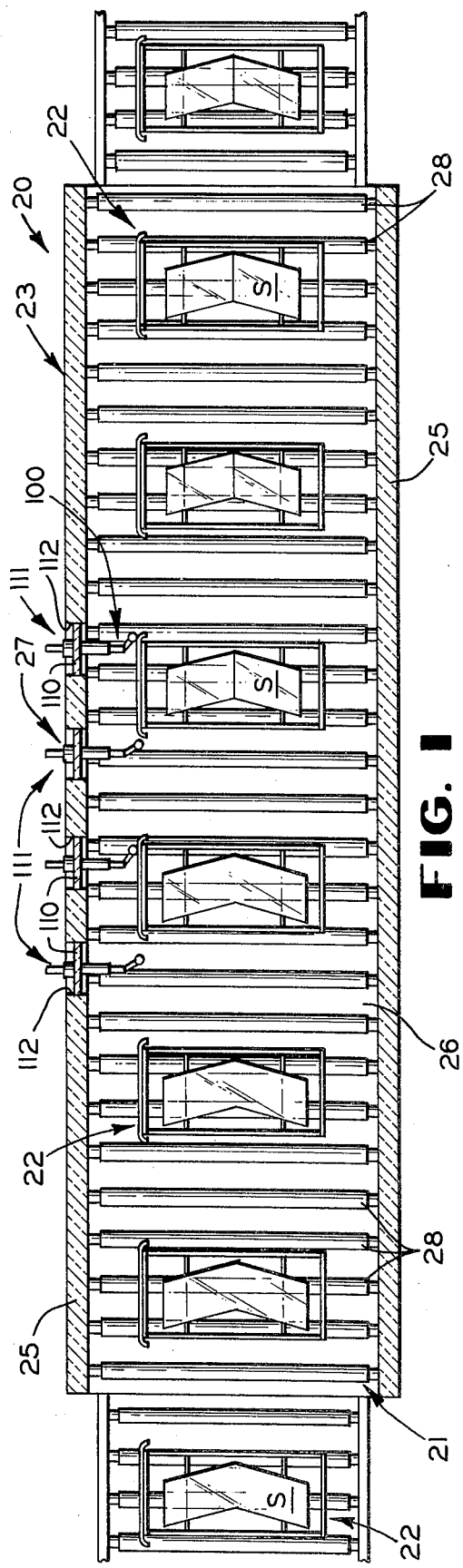
FIG. 1 is a top plan view of a bending furnace with the cover removed, showing a plurality of glass shaping mold assemblies being conveyed therethrough.

Referring now in detail to the illustrated embodiment depicted in the accompanying drawings for carrying out this invention, there is shown in FIG. 1 a glass sheet bending installation, comprehensively designated 20, which includes a continuous, horizontal conveyor system 21 adapted to support and advance a series of glass laden mold assembles, generally designated 22, in a continuous, substantially horizontal path through an elongated bending or heating furnace 23 for the purpose of heating the sheets S carried by the mold assemblies to their softening point or bending temperatures. After bending, the mold assemblies 22 can be advanced by the conveyor system 21 into and through a tempering or annealing station (not shown).

The heating furnace 23 is of the tunnel-type having side walls 25, a top and bottom wall (not shown) defining a heating chamber 26. The heating chamber 26 can be heated in any desired manner by suitable heating means, such as gas burners or electrical resistance elements for example (not shown) located in the top and side walls of the furnace 23. Such heating means are suitably controlled by apparatus (also not shown) to obtain the desired temperature at various points in the heating chamber 26. In addition, furnace 23 is provided with electrical supply or conducting means, generally designated 27, adapted to deliver electrical current to each glass sheet S via its associated mold assembly 22 during the advancement thereof through furnace 23 for imparting at least one sharp, V-shaped bend to the sheet in a manner that will hereinafter be described in detail. The mold assemblies 22 are carried through the heating chamber 26 of furnace 23 on a plurality of conveyor rolls 28, forming a part of the conveyor system 21, and extending transversely across furnace 23 with their respective opposite ends being suitably journalled for rotation and driven by conventional power means well known in the art.

Figure 2:
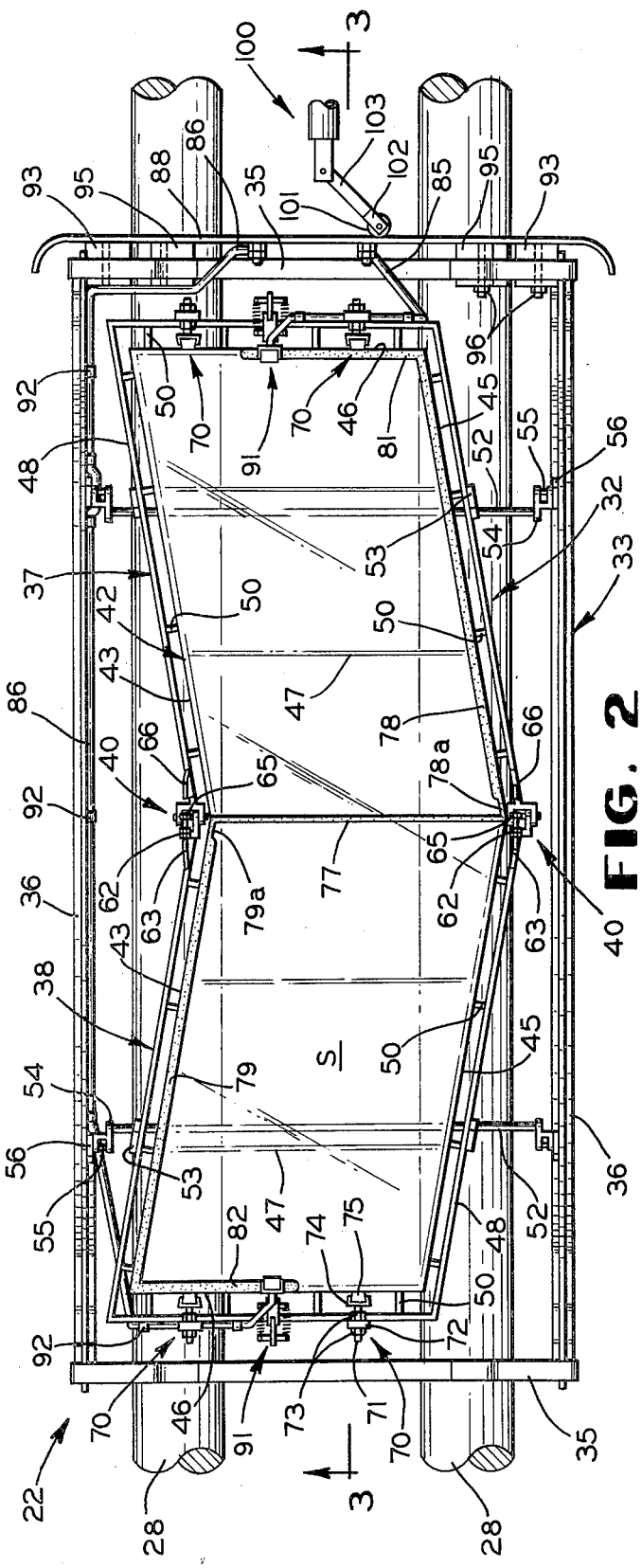
FIG. 2 is a top plan view of a gravity mold assembly shown in an open, glass receiving position, and which incorporates the novel features of the present invention.
Figure 3:
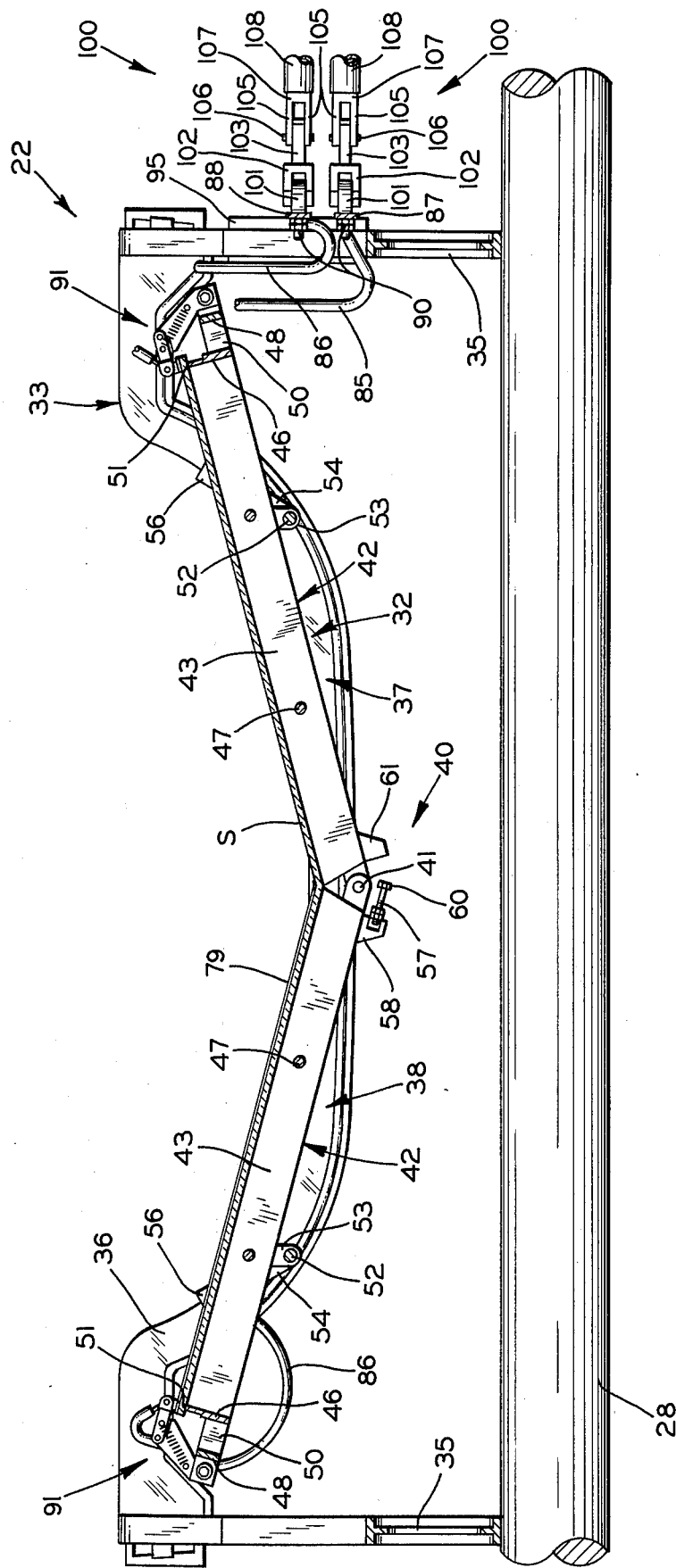
FIG. 3 is a longitudinal sectional view, on an enlarged scale, taken along the line 3—3 of FIG. 2, and showning the mold assembly in a closed position.

Referring now to FIGS. 2 and 3, the mold assembly 22 employed to form the sharp angular bends in the finished closure product comprises a skeleton-type mold 32 mounted on a substantially rectangularly shaped support frame 33. This frame comprises a pair of upwardly extending end members 35 which are connected to each other at their upper ends by a pair of parallel, longitudinally extending mold supports 36 whose contour in elevation corresponds generally to the shape of the skeleton-type mold 32.

The mold 32 comprises a pair of mold sections 37 and 38 pivotally connected together adjacent their inner ends by means of diametrically opposed hinge assemblies, generally designated 40, for pivotal movement between an open, glass receiving position shown in FIG. 2 and a closed, final position shown in FIG. 3. These hinges 40 can be conventional and it is believed that no further amplification or description thereof is necessary, it being noted that the hinges include horizontally aligned pivot pins 41 defining a common pivot axis about which the mold sections 37 and 38 swing.

The mold sections 37 and 38 are substantially identical and mirror images of each other and each comprises a shaping rail 42 of substatially U-shaped configuration in plan having laterally spaced, parallel side portions 43 and 45 connected by an end portion 45. Tie rods 47 span the space between the shaping rail side portions 43 and 45 and are rigidly secured thereto to maintain the same in fixed position relative to each other. The sahping rail 42 is carried by a mating support rail 48 having the same general outline as shaping rail 42, but slightly larger in peripheral dimension than the latter and connected in spaced relation thereto by separator blocks 50. The shaping rail 42 is provided with an upper shaping surface 51 upon which the glass sheet S rests during the forming thereof and which is spaced above the upper surface of support rail 48.

While it will be convenient to describe the apparatus of this invention in connection with the formation of a glazing closure having a single sharp, V-shaped bend therein, it should be understood that the principles of this invention are equally applicable in the production of glass sheets having multiple V-shaped bends and/or multiple layered sheets of glass, such as conventional laminated windshields for example, or any glazing in which it is desired to form one or more sharp angular bends therein. Where two or more sharp V-shaped bends are contemplated, the mold proper may be formed of three or more sections hingedly connected together rather than only two pivotal sections as employed in the simple, articulated mold shown and described in the illustrated embodiment of this invention. The number of sections employed and their configurations are dictated by the specific bent shape desired to be imparted to the particular glass sheet being formed.

To support the mold for movement from an open position wherein the flat glass sheet to be bent is received to the closed position of FIG. 3, a transversely extending pivot bar 52 is rigidly secured to each of the mold sections 37,38 by means of lugs 53 depending downwardly from the associated support rail 48 and through which the bar 52 extends. The opposite ends of each bar 52 are rotatably supported by links 54, in turn pivotally carried by pins 55 secured to lugs 56 rigidly secured to the mold supports 36 of support frame 33. The pivot bars 52 are normally adjusted and located off center of their associated mold sections 37,38 to allow the mold to close due to their weights unless a force is applied to the outermost ends of such mold sections, causing the same to pivot about bars 52 to raise the inner ends of the sections.

Means are provided for limiting the extent of pivotal movement of the mold sections 37 and 38 to their open position (FIG. 2), assuring a generally horizontal disposition thereof for proper positioning of the flat glass sheet thereon. Such means includes a pair of adjustable stops 57 (FIG. 3) mounted on lugs 58 depending downwardly from the support rail inner free ends of mold section 38. These stops 57 are provided at their distal ends with bumpers 60 engageable with downwardly directed abutment members 61 rigidly secured to the adjacent support rail inner free ends of mold section 37. Also, stop means are provided for limiting pivotal movement of the mold sections 37 and 38 to their closed position, thereby preventing any tendency toward inverse or overbending. Such means include a pair of adjustable stops 62 (FIG. 2) mounted on upstanding lugs 63 affixed to the support rail inner free ends of mold section 38. Stops 62 are provided with bumpers 65 engageable with upstanding abutment members 66 rigidly secured to the adjacent support rail inner ends of mold section 37.

Locator stops, generally designated 70, are mounted on the transversely extending portions of support rails 48 for properly positioning the flat glass sheet S slightly above the major portion of the mold sections 37 and 38 when in the open position and for exerting pressure on the ends of the sheet while maintaining the same in proper relation to said mold during the bending thereof. As best shown in FIG. 2, each stop comprises an elongated rod 71 projecting through a support plate 72 affixed to the transversely extending portion of support rail 48 and adjustably secured to such plate by means of lock nuts 73. A holder 74 is secured to the inner end of rod 71 for receiving a block 75 formed of any suitable heat-resistant material and which is engageable with the edge of the glass sheet.

As hereinbefore mentioned, U.S. Pat. Nos. 3,762,903 and 3,762,904 disclose the process of forming relatively sharp, angular bends in glass sheets by providing an electrically conducting path on at least one surface of the glass sheet along the line about which it is desired to bend the sheet. Electric current is then passed through the path to heat the same by resistance and thereby the glass sheet in the area immediately adjacent or beneath the path, causing the preheated sheet to bend by gravity along the path to form the V-shaped bend. The mold assembly 22 is employed to carry out the above process in a mass production operation and incorporates electrical conducting means for delivering the necessary electric charge to the glass sheet to be bent.

In the illustrated embodiment of this invention, the electric current preferably is introduced into the glass sheet at the opposite ends of the sheet remote from the electrically conducting path, identified in FIG. 2 by reference numeral 77, rather than at the opposite ends of such path 77. The reason for this is that the least amount of movement or displacement of the glass sheet relative to the mold during bending occurs at such opposite ends of the sheet, thereby minimizing friction therebetween and the possible removal of or damage to the conductive material which constitutes the electrically conducting path 77. Accordingly, the path is extended to the opposite ends of the glass sheet by means of opositely directed conductor lines 78 and 79 formed on the sheet extending along the opposite longitudinal edges of the sheet and provided with right angularly related inturned portions 81 and 82, respectively, extending along the opposite transverse edges of the sheet. However, the width or cross sectional area of path 77 is substantially less than that of conductor lines 78 and 79 to consequently provided a substantially greater resistance to current flow than the latter and thereby the generation of relatively greater heat to effect the bend along the desired line formed by path 77. In order to prevent possible damage to the opposite ends of conducting path 77 due to the drastic transition of the greater cross sectional areas of lines 78 and 79 to the lesser cross sectional area of path 77, the cross sectional areas of conductor lines 78 and 79 are reduced, as shown at 78a and 79a in FIG. 2, prior to the joining thereof with conducting path 77.

The primary electrically conducting path 77, as well as the conductor lines 78–82, can be formed on each glass sheet S in accordance with the method set forth in U.S. Pat. No. 3,762,903. If desired, a groove may be formed in one or both surfaces of the glass sheet along the line about which it is desired to bend the sheet to facilitate the bending operation, as set forth in detail in U.S. Pat. No. 3,762,904, whereby the electrically conducting path 77 may then be formed in one of such grooves. while various materials may be used to form such electrically conducting path and conductor lines, preferred compositions are comprised of conductive metal pastes. These materials, sometimes also referred to as "inks", are applied to the glass sheet by conventional silk screen processes, painting, or other conventional uniform coating processes and then are heated or fired to fuse the material to the sheet.

Typically, the pastes comprise conductive metal particles, e.g., silver, glass frit particles and organic binders and salt. Although the conductive silver pastes are ideally suited for forming the electrically conducting path 77 and lines 78–82, other conductive metal pastes may be used, e.g., those containing gold, paladium, platinum and alloys thereof. In addition, air drying dispersions of conductive metals may be employed. One particular material of this type which has been used successively is "Dag 422", a dispersion of silver plus graphite in a water carrier obtained rom the Atcheson Colloids Company, Port Huron, Michigan. Also, material such as electrically conducting tapes which may or may not be removed after the bending step, can be employed.

The electrical conducting means on mold assembly 22 for delivering current from the electrical means 27 of heating furnace 23 to portions of the glass sheet in order to effect the desired relatively sharp angular bends therein includes a pair of flexible conductor leads 85 and 86 connected to a pair of bus bars 87 and 88 by suitable fasteners 90. The other ends of leads 85 and 86 are suitably connected to a pair of opposed contact assemblies, constructed in accordance with this invention and generally designated 91, and which will be hereinafter described in detail. It should be noted that the conductor lead 86 extends upwardly and transversely along end member 35 and then longitudinally along one of the support frame mold supports 36 (FIG. 3). Both leads 85 and 86 are held in place against portions of the mold 32 and support frame 33 by suitable clamps 92.

If desired, bus bars can be mounted on the support frame 33 in lieu of the leads 85 and 86 to electrically connect bus bars 87 and 88 to the opposed contacts 91. Where more than one bend is desired in a piece of glass, a silver bus bar can be screened or rolled on the edge or top surface of the glass as a connecting means in series between the two or more primary conducting paths about which the glass is to be bent. Alternatively, the bus bars formed on the glass sheet may be in the form of isolated glass strips adjacent the opposite ends of such primary conducting paths when it is desired to form a parallel circuit with the primary paths. In the latter case, the contact assemblies 91 preferably would be mounted on the side portions of support rail 48 adjacent the longitudinal, rather than transverse, edges of the glass sheet and in the regions of such bus bar strips.

Bus bars 87 and 88 of support frame 33 are connected to the support frame end members 35 and extend transversely thereacross in spaced relation thereto by means of insulating blocks 93 and 95 held in place by suitable fasteners 96 extending from bus bars 87 and 88 and through the blocks 93 and 95. These bus bars 87 and 88 are adapted to be engaged by a pair of electrically conducting probe assemblies. Generally designated 100, connected to a suitable source of electrical power (not shown) and forming a part of the electrical conducting means 27 of furnace 23. Each probe assembly 100 comprises a contact wheel 101 rotatably journalled in a yoke 102 affixed to the distal end of an arm 103 pivotally mounted between a pair of extensions 105 by means of a pivot pin 106. The extensions 105 are secured to a tube 107 adjustably slidably received in a sleeve 108, in turn rigidly secured in a suitable opening formed in a plate 110 (FIG. 1) removably secured in the furnace side wall 25. Means (not shown) are provided for biasing the probe arm 103 into an extended position into the path of movement of the bus bars 87 and 88 so as to be engaged thereby during conveyance of the mold assembly 22 through the furnace.

The probe assemblies 100 are mounted in pairs in plate 110, which as mentioned earlier is removably secured in the furnace wall 25. Thus, each pair of probe assemblies 100 and its associated plate 110 form of removable unit 111, which can be selectively inserted into or removed from suitable openings 112 formed in one of the side walls 25 of furnace 23. As shown in FIG. 1, a number of such units 111 are mounted in a longitudinally spaced relation along furnace wall 25 is such a manner as to assure electrical contact of at least one pair of the probe assemblies 100 with the bus bars 87 and 88 of the mold assembly 22 during its passage through the furnace 23 for a time sufficient to heat the glass sheet in the area of conducting path 77 to a temperature above the bending point of the glass.

Except for contact asemblies 91, which are the essence of the present invention, the mold assembly thus far described is fully disclosed in the aforementioned application Ser. No. 558,288. While the contactors disclosed in said application were generally satisfactory for the purpose intended, maintaining such contactors in continuous engagement with electrical conductor lines formed on the glass sheet presented problems. By way of example, excessive vibration of the mold transmitted to the contactors caused them to sometimes interrupt contact with the conductor lines to shrt out and arc, tending to burn off portions of the conductor lines. Also, the spring biased contactors often interferred with the smooth and rapid placement of the glass sheet on the mold prior to bending. Moreover, the contactors had to be disengaged from the conductor lines by hand and maintained thereby in an out-of-the-way position to permit removal of a finished bent sheet from the mold.

Contact assemblies 91 of this invention consitute an improvement over the contactors described in application Ser. No. 558,288 by the provision of means for urging the contactors into continuous engagement with the conductor lines formed on the glass sheet to be bent regardless of vibratory action imparted to the mold or the relative movement between the latter and the glass sheet. In addition, the contactors can be moved into an out-of-the -way position to permit easy removal and replacement of glass sheets from and on the mold assembly.

Figure 4:
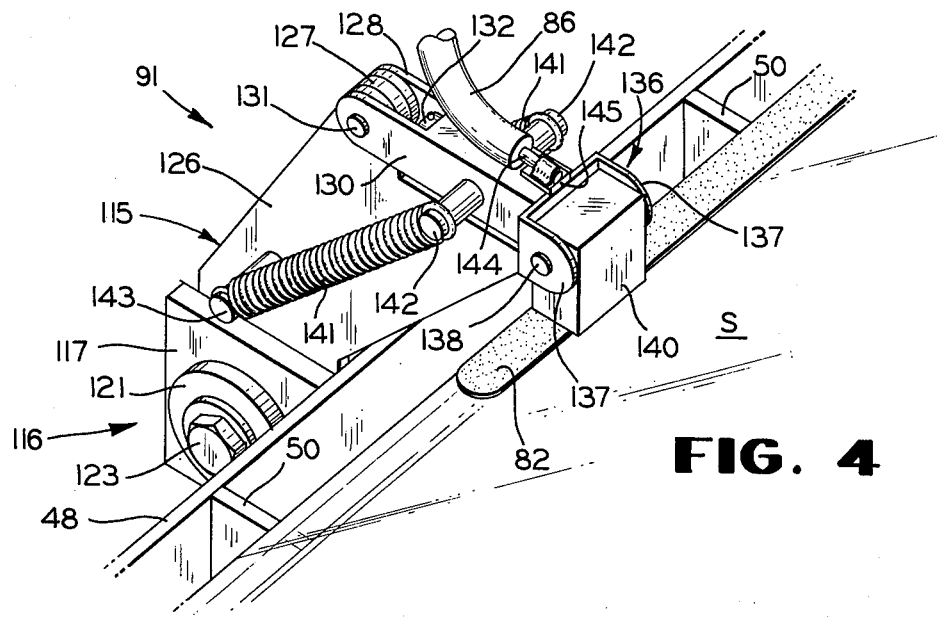
FIG. 4 is an enlarged perspective view of one form of an electrical contactor constructed in accordance with the principles of this invention.
Figure 6:
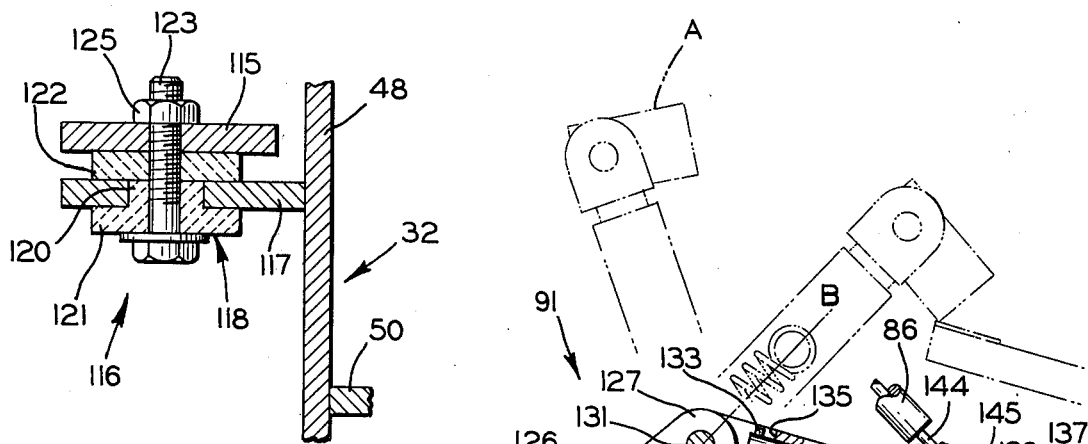
FIG. 6 is a horizontal sectional view, taken along the line 6—6 of FIG. 5.
Figure 5:
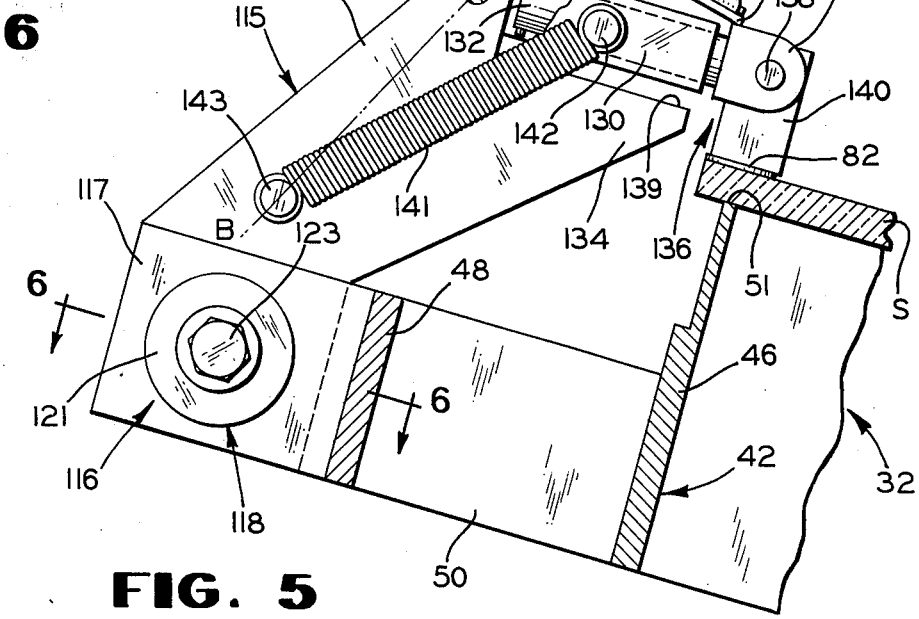
FIG. 5 is a side elevational view, partly in section and with parts broken away, of the electrical contactor of FIG. 4.

Referring now in detail to FIGS. 4, 5 and 6, each contact assembly 91 comprises a mounting bracket 115 secured at its lower end by connecting means 116 (FIG. 6) to a laterally projecting extnesion 117 welded or otherwise fixedly secured to the support rail 48 of mold 32. The connecting means 116 include a composite, two-piece insulator having a first section 118 consisting of a bushing 120 received in a suitable opening formed in extension 117 and an enlarged diameter flange 121 resting against one face of extension 117. The other insulator section 122 is in the form of a disc abutting against the other face of extension 117. Sections 118 and 122 are suitably bored to receive a bolt 123, which also extends through the bracket 115. A suitable nut 125 is threaded onto bolt 123 and tightened against bracket 115 to secure the assembly in place. Sections 118 and 122 are formed of any suitable non-conducting material to electrically insulate bracket 115 from the mold 32.

Bracket 115 is provided with an integral, upper portion 126 inclined toward the mold proper and having an integral lug 127 fomred at the upper end thereof. The bifurcated end 128 of the pivotal support or arm member 130 straddles lug 127 and is pivotally mounted thereon by means of a pivot pin 131. The major portion of arm member 130 is of a tubular, hollow, box-like construction for receiving a cylindrical shaft 132 therein. A stop in 133 extends diametrically through the shaft 132 adjacent the inner end thereof and is engageable with the inner end 135 of arm member 130 to limit axial movement of the shaft 132 relative to such arm member.

The outer or distal end of shaft 132 is provided with a contact holder in the form of a yoke 136 having spaced, projecting ears 137 between which is pivotally mounted, as best shown at 138 in FIG. 4, a contact member 140 adapted to engage the conductor line 82 formed on the upper surface of the glass sheet S adjacent one edge thereof. Although contact member 140 proferably is formed of carbon, it should be understood that it can be formed of any suitable material possessing satisfactory electrical conducting properties and may take any shape and dimensions desired.

The limited telescopic mounting of shaft 132 within the tubular pivot arm member 130 and the substantially free rotatioal movement of shaft 132 within arm 130 permits some play in both the longitudinal direction toward and away from conductor line 82 and laterally in a short arcuate path to permit contact member 140 to properly seat itself on conductor line 82. Moreover, the pivot pin 138 permits free forward and rearward rocking movement of contact member 140 to further facilitate proper seating thereof on line 82.

Means are provided for biasing or urging contact member 140 into positive engagement with the electrical conducting portions of sheet S. To this end, a pair of heat-resistant, tension springs 141 are mounted at their one ends on studs 142 projecting laterally from the opposite sides of arm member 130 and anchored at their other ends to studs 143 projecting outwardly from the opposite sides of mounting bracket 115 adjacent the lower end of inclined portion 126. The dual springs 141 provide a sufficiently strong force pressing the contact member 140 against conductor line 82 and serve to dampen vibrations transmitted to arm member 130 so as to maintain the latter in continuous contact with its associated line 82. Moreover, the dual springs serve to stabilize the arm member 130 by applying equal pressures along opposite sides of the arm 130. Upon movement of contact member 140 and thereby arm member 130 in the counter-clockwise direction, as viewed in FIG. 5, to move the springs 141 over or past center, which center line is identified by line B—B in FIG. 5, the springs 141 become effective to rapidly swing arm member 130 further in such counter-clockwise direction into an out-of-the-way position, shown at A in FIG. 5, to facilitate glass removal from the mold and the replacement thereof with a fresh sheet.

As best shown in FIG. 5 bracket 115 is provided with an integral, angular extension 134 projecting forwardly toward the mold shaping rail. Extension 134 is formed with an upper surface 139 extending generally horizontally in substantial parallelism with arm 130 when the latter is in its operative position. This surface 139 serves as a stop limiting clockwise movement of arm 130 to preclude a short in the electrical system otherwise caused by engagement of contact member 140 with shaping rail portion 46 or any other part of the mold 32 in the absence of a glass sheet on mold 32 or in the event of breakage of the glass sheet supported on mold 32.

Each of the conductor leads is stripped of insulation, as shown at 144 in FIGS. 4 and 5, at the end thereof remote from its associated bus bar connection and welded or otherwise fixedly secured to a tab 145, in turn secured to the yoke 136. Thus, current is supplied from the associated bus bar to contact member 140 via lead 86, tab 145, yoke 136, and pivot pin 138. The contact assembly 91 is completely insulated from the frame of the mold 32 by the two-piece insulator 118,122 at the connection 116 between contact assembly 91 and mold 32.

In a mass production operation, flat glass sheets S with electrically conducting paths 77 and conductor lines 78-82, respectively, formed thereon are placed on mold assemblies 22 with each sheet being supported adjacent its opposite transverse edges on the shaping surface 51 of the mold assembly 22 when in its open position (FIG. 2). These opposite edges also engage the opposed locator stops 70 and the flat glass sheet S functions as a strut to retain the mold in the open position during the early stages of the bending operation. The opposed contact members 140, which have been in their glass disengaging positions indicated at A in FIG. 5 when the sheet S is placed in the mold, are then swung into contact with the conductor lines 82 formed on the sheet. The mold assemblies 22 are then loaded at spaced intervals on the conveyor 21 at the entrance end of the furnace 23 and are advanced therethrough on conveyor rolls 28. Prior to introducing power to the mold assemblies 22, the glass sheets S are heated to a relatively high temperature in furnace 23, for example, above the strain point of the glass but below the temperature at which the glass bends to any significant degree. To this end, temperatures in the range of approximately 900° F. to 1100° F. have been found satisfactory. This preliminary heating is to prevent inducing permanent stresses in the glass, obviate the tnedency of the glass to crack when subsequently heated locally along the electrically conducting path 77 to its bending temperature, and also to engable the accomplishment of this latter step within a time acceptable from a commercial standpoint and with the use of a reasonable amount of electrical energy.

At about the time the advancing glass sheet reaches the desired overall temperature, the bus bars 87 and 88 of the sheet supporting mold assembly 22 engage the contact wheels 101 of the first pair of extended probe assemblies 100 to complete a circuit and supply electrical power to the conducting path 77 via one of the probe assemblies 100, bus bar 88, conductor path 77, conductor line 78,81, the opposed contact member 140, conductor lead 85, bus bar 87 and the other probe assembly 100. As the most assembly 22 advances along the conveyor each succeeding pair of probe assemblies 100 engages bus bars 87 and 88 after the preceding pair of probe assemblies 100 have been disengaged therefrom to pass substantially the same current, although interrupted, into the mold-glass circuit. While four units 111 or pairs of probe assemblies 100 are employed in the illustrated embodiment of FIG. 1 for ease of illustrateion, it should be appreciated that this number may vary as dictated by the speed of the conveyor rolls 28 and te time necessary to adequately heat the sheet in the area immediately adjacent or beneath path 77 to a temperature above the bending point of the glass. When the area of the sheet underlying path 77 is heated to a temperature above the bending temperature of the glass, for example above approximately 1200° F., the sheet bends sharply along path 77 and ultimately settles by gravity into the desired generally V-shaped configuration illustrated in FIG. 3.

It should be appreciated that the lesser cross-sectional area of the electrically conductive path 77 creates a substantially higher resistance than conductor lines 78–82 so that the former will generate the necessary heat to effect the sharp bend thereon before lines 78–82 are heated sufficiently to create any undesirable deformation therealong.

As the glass sheet becomes plastic during the heating thereof and begins to sag by gravity, the mold sections 37 and 38 will begin to collapse toward the closed position, pivoting about the hinge assemblies 40. During this closing action, the contact members 140 are maintained in engagement against the transverse marginal edges of the glass sheet by means of the pressure exerted through their respective springs 141, assuring the continued supply of electrical power to the conducting path 77 about which the relatively sharp bend occurs. The sheet continues to bend sharply along the path 77 with consequent movement of mold sections 37 and 38 until the latter come to rest in the fully closed position. The sheet settles by gravity into registry with the shaping surface 51 of shaping rails 42 in the fully closed position of the mold (FIG. 3) to produce the desired V-shaped condiguration of the finished product.

After bending, the glass laden mold assemblies 22 leave the furnace 23 and are advanced on conveyor 21 through either a tempering or annealing station, hereat the opposite surfaces of the heated bent sheet S are subjected to blasts of a cooling medium, such as air for example. Upon leaving this latter station, the sheet may be further cooled to bring the temperature thereof down to a level sufficient for handling. The sheet is then advanced to a glass discharge station for automatic or manual unloading. In either case, upward movement of the sheet carries contact members 140 therewith, causing the arm member 130 to pivot about pin 131 in a counter-clockwise direction, as viewed in FIG. 5, against the bias of springs 141. When the arm membes 130 reach a position just past center i.e., beyond the line identified as B-B in FIG. 5, the springs 141 become effective to flip arm member 130 rapidly in the same direction, clearing the opposite sides of the sheet and permitting easy unloading of the same off mold 32. The contact members 140 remain in such out-of-the-way position until forcibly pivoted in the opposite direction after the placement of a fresh sheet on the mold 32.

Figure 7:
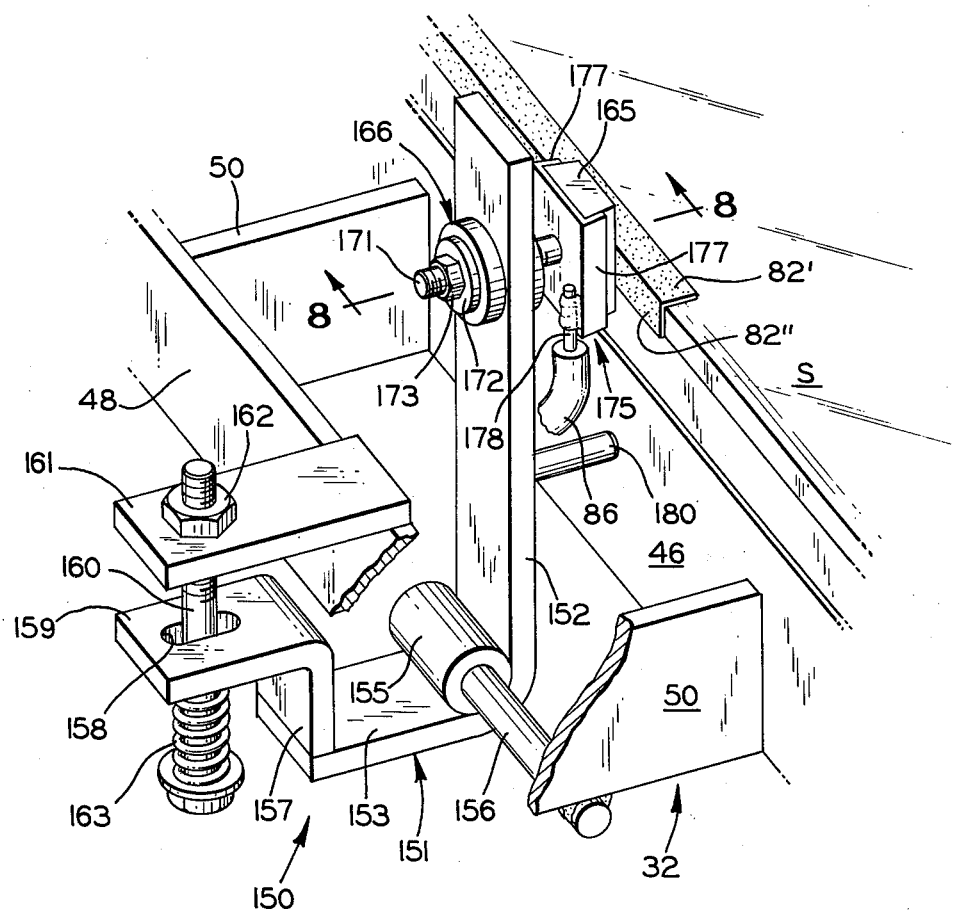
FIG. 7 is a perspective view of another form of electrical contactor of this invention.
Figure 8:
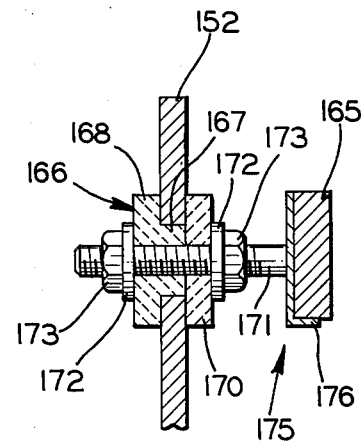
FIG. 8 is a vertical sectional view, on an enlarged scale, taken along line 8—8 of FIG. 7.

Another form of contact asembly of this invention, generally designated 150, is shown in FIGS. 7 and 8 and comprises a pivotal arm 151 having an elongated upright portion 152 and a right angularly related horizontally extending portion 153. The arm 151 is provided at the juncture of arm portions 152 and 153 with a cylindrical hinge 155 rotatably mounted on a shaft 156 suitably affixed to the mold superstructure. An inverted L-shaped bracket 157 is welded or otherwise fixedly secured to the outer end of arm horizontal portion 153. An elongated slot 158 is formed in the horizontal leg 159 of bracket 157 for receiving a bolt 160 therethrough, the slot 158 providing sufficient clearance for the bolt 160 during pivotal movement of the arm 151.

Bolt 160 also extends through a horizontally extending plate 161 suitably affixed at its inner end to support rail 48 of mold 32. A lock nut 162 secures the bolt 160 to plate 161. A heat-resistant coil spring 163 is disposed about bolt 160 between the bolt head and the underside of bracket leg 159 for biasing or urging arm 151 in a clockwise direction, as viewed in FIG. 7.

Means are provided for connecting the contact member 165 of this embodiment of the invention to the arm upright portion 152, such means including a composite, two-piece insulator formed of a first section 166 consisting of a bushing 167 (FIG. 8) received in a suitable opening in the arm portion 152 and an intergral, enlarged diameter flange 168 abutting against one side of arm portion 152. The other section 170 is in the form of a disc disposed in abutting relation against the other side of arm portion 152. The sections 166 and 170 are held together and connected to arm portion 152 by a threaded stud 171 extending therethrough and surmounted with opposed washers 172 pressed against the sections 166, 170 by lock nuts 173 tightened thereagainst. One end of stud 171 is provided with a holder 175 having a bottom wall 176 and converging side walls 177 for receiving the complementary-shaped contact member 165. The contact member 165, preferably formed of carbon or any suitable electrically conducting material, is readily replaced when worn or damaged by merely sliding it upwardly out of its holder 175 and slipping a fresh contact member 165 downwardly in place.

The end of each conductor lead remote from its bus bar connection is stripped of its insulation, as shown at 178 in FIG. 7, and soldered or otherwise fixedly secured to the holder 175. The sections 166 and 170 electrically insulate the stud 171 and thereby contact member 165 from pivotal arm 151 and mold 32. The upper end of arm upright portion 152 projects well above the insulated connecting means to serve as a grip or handle for manually manipulating the arm 151.

In this form of the invention, the contact member 165 is urged by means of the spring 163 against the edge of the glass sheet S, such edge being provided with an electrically conducting strip 82" integrally connected to and forming a continuation of the conductor line 82' formed on the upper surface of the sheet S. AS in the embodiment of FIGS. 4-6, the conductor line 82' is an extension of conductor line 79 leading to one end of the electrically conducting path 77. A stop in the form of a stud 180 (FIG. 7) projects inwardly from arm upright portion 152 toward shaping rail portion 46 of the mold 32 to limit inward movement of such upright portion 152 and thereby contact member 165 to prevent a short in the electrical system caused by engagement of the contact member 165 with the shaping rail portion 46 or any other part of the mold 32 in the absence of a glass sheet on mold 32 or in the event of breakage of a sheet supported on the mold.

Figure 9:
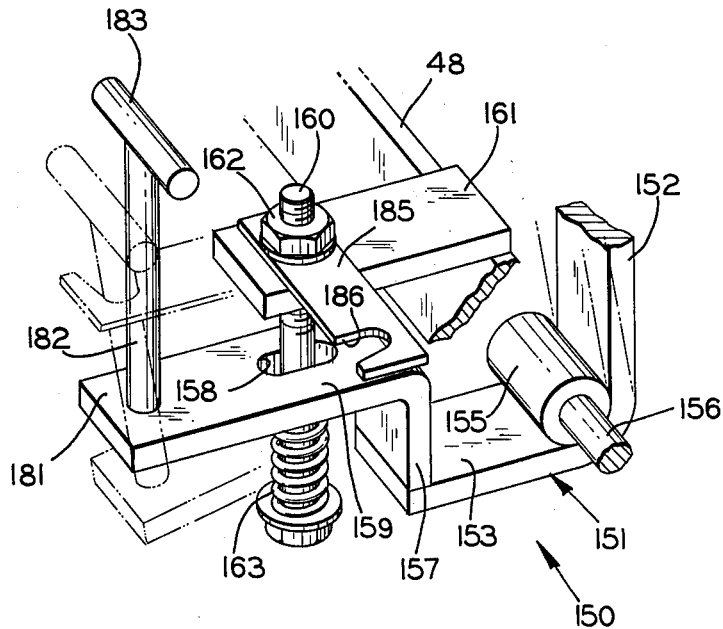
FIG. 9 is a fragmentary perspective view of the electrical contactor of FIG. 7, showing details of a latching mechanism.

FIG. 9 illustrates a latching mechanism that can be employed with the form of contact assembly shown in FIGS. 7 and 8 for maintaining the contact member 165 in and out-of-the-way position when loading and unloading glass sheets onto and from the mold 32. To this end, the horizontal leg 159 of bracket 157 is extended, such as shown at 181 in FIG. 9, such extension having an upright post 182 welded or otherwise fixedly secured thereto. The post 182 is surmounted with a handle 183 to facilitate manual operation. A lock bar 185 is pivotally mounted on plate 161 by means of the bolt 160 and is provided with a recessed or cut-out section 186 adapted to receive post 182 when the latter is displaced outwardly in the contact member disengaged position of assembly 150 as shown in phantom in FIG. 9. When it is desired to remove a bent sheet S from mold 32, the attendant simply pulls on handle 183 to pivot arm 151 and thereby move contact member 165 away from the glass edge and then swings locking bar 185 in a horizontal plane so as to engage the recess 186 thereof with post 182. This maintains the contact member 165 in such disengaged position, facilitating the replacement of a finished bent sheet with a fresh flat sheet on the mold 32.

From the foregoing, it is apparent that the objects of e present invention have been fully accomplihed. A new and improved contact assembly is provided for delivering a constant flow of current into the glass circuit in an efficient manner without interruption. Upon completeion of the bending and heat treating cycles, the contact forming a part of such assembly can be readily disengaged and maintained in such disengaged position for convenient glass removal and loading from and onto the mold 32.

It is to be understood that the forms of the invention herewith shown and described are to be taken as illustrative embodiments only of the same, and that various changes in the shape, size and arrangement of parts may be resorted to without departing from the spirit of the invention.

We claim:

1. In apparatus for bending a glass sheet to a relatively sharp angle by passing an electric current through an electrically conducting line formed on the sheet with a portion extending along a line about which heat is generated to bend the sheet therealong and which includes a frame, an outline type bending mold supported on said frame and having a shaping surface formed thereon, electrically conducting means including at least one electrical contact mounted on said mold in spaced relation to said shaping surface and engageable with said electrically conducting line on said glass sheet supported on said mold; the improvement which comprises a holder for said contact, a support, means connecting said holder to said support, means pivotally mounting said support on said mold for pivotal movement between a glass engaging position and a glass disengaged position, and means for biasing said support into said glass engaging position to urge said contact against said electrically conducting line.

2. Apparatus according to claim 1, including means for electrically insulating said contact from said mold.

3. Apparatus according to claim 1, wherein said support comprises a tubular member encasing a freely rotatable shaft therein, the outer end of said shaft being secured to said holder.

4. Apparatus according to claim 3, including means for limiting free axial movement of said shaft within said tubular member.

5. Apparatus according to claim 1, including means for pivotally connecting said contact to said holder for rocking movement relative thereto.

6. Apparatus according to claim 1, wherein said biasing means comprises a pair of springs connected at their one ends to opposite sides of said pivotal support and at their other ends to said mounting means.

7. Apparatus according to claim 1, including a plate extending outwardly from said mold, said support comprising an upright portion and an angularly related portion having a bracket in spaced relation to said plate, and means connecting said bracket to said plate for relative movement toward and away therefrom.

8. Apparatus according to claim 7, wherein said biasing means comprises a spring forcing said bracket toward said plate to urge said support into said operative position.

9. Apparatus according to claim 7, including means on said plate for latching said support in said inoperative position.

10. Apparatus according to claim 2, wherein said electrically insulating means forms a part of said connecting means.

11. Apparatus according to claim 1, including means for limiting biased movement of said support toward said mold.

12. Apparatus according to claim 11, wherein said limiting means includes an extension formed on said support mounting means engageable by said support in the absence of a glass sheet on said mold.

13. Apparatus according to claim 11, wherein said limiting means comprises a stop on said support engageable with a portion of said mold in the absence of a glass sheet on said mold.

* * * * *

UNITED STATES PATENT AND TRADEMARK OFFICE
CERTIFICATE OF CORRECTION

PATENT NO. : 4,015,969
DATED : April 5, 1977
INVENTOR(S) : Laurence A. Brown et al It is certified that error appears in the above-identified patent and that said Letters Patent are hereby corrected as shown below:

```
Col. 1, line 15, "tyep" should be --type--
Col. 1, line 38, "cruvatures" should be --curvatures--
Col. 2, line 4, "escribed" should be --described--
Col. 2, line 12, "facitlitate" should be --facilitate--
Col. 2, lines 57 and 58, "showning" should be --showing--
Col. 3, line 15, "assembles" should be --assemblies--
Col. 4, line 3, "45" (2nd occurrence) should be --46--
Col. 4, line 7, "sahping" should be --shaping--
Col. 5, line 46, "opositely" should be --oppositely--
Col. 5, line 53, "provided" should be --provide--
Col. 7, line 1, ". Generally" should be --, generally--
Col. 7, line 21, "of" should be --a--
Col. 7, line 26, "is" should be --in--
Col. 7, line 43, "shrt" should be --short--
Col. 7, line 52, "consitute" should be --constitute--
Col. 7, line 66, "extnesion" should be --extension--
Col. 8, line 16, "fomred" should be --formed--
Col. 8, line 22, "in" should be --pin--
Col. 8, line 34, "proferably" should be --preferably--
Col. 8, line 40, "rotatioal" should be --rotational--
Col. 9, line 54, "tnedency" should be --tendency--
```

UNITED STATES PATENT AND TRADEMARK OFFICE
CERTIFICATE OF CORRECTION

PATENT NO. : 4,015,969
DATED : April 5, 1977
INVENTOR(S) : Laurence A. Brown et al It is certified that error appears in the above-identified patent and that said Letters Patent are hereby corrected as shown below:

Col. 9, line 57, "engable" should be --enable--
Col. 9, line 67, after "conductor" insert --lead 86, contact member 140, conductor lines 82,79, conducting--
Col. 10, line 2, "most" should be --mold--
Col. 10, line 10, "illustrateion" should be --illustration--
Col. 10, line 12, "te" should be --the--
Col. 10, line 44, "condiguration" should be --configuration--
Col. 10, line 48, "hereat" should be --whereat--
Col. 10, line 60, "membes" should be --members--
Col. 10, line 62, "member" should be --members--
Col. 11, line 59, "AS" should be --As--
Col. 12, line 7, "and" (first occurrence) should be --an--
Col. 12, line 29, "e" should be --the--
Col. 12, line 29, "accomplihed" should be --accomplished--
Col. 12, line 33, "completeion" should be --completion--

Signed and Sealed this

Twenty-first Day of June 1977

[SEAL]

Attest:

RUTH C. MASON
Attesting Officer

C. MARSHALL DANN
Commissioner of Patents and Trademarks